US008707711B2

(12) United States Patent
Tanimura

(10) Patent No.: US 8,707,711 B2
(45) Date of Patent: Apr. 29, 2014

(54) SEALING APPARATUS WITH MULTISTAGE BRUSH SEAL

(75) Inventor: Kazuhiko Tanimura, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 797 days.

(21) Appl. No.: 12/887,804

(22) Filed: Sep. 22, 2010

(65) Prior Publication Data

US 2011/0072831 A1    Mar. 31, 2011

(30) Foreign Application Priority Data

Sep. 25, 2009    (JP) ................................. 2009-220469

(51) Int. Cl.
*F02C 3/14*    (2006.01)
(52) U.S. Cl.
USPC ............................................ 60/805; 277/355
(58) Field of Classification Search
USPC ................... 60/806, 805; 277/335, 347, 409, 277/411–413, 416, 422, 431, 432, 355; 415/170.1, 170.3, 170.5, 174.3, 174.2, 415/174.5
See application file for complete search history.

(56) References Cited

U.S. PATENT DOCUMENTS

| | | | |
|---|---|---|---|
| 4,756,536 A * | 7/1988 | Belcher | 277/355 |
| 5,181,728 A | 1/1993 | Stec | |
| 5,630,590 A | 5/1997 | Bouchard et al. | |
| 5,862,666 A | 1/1999 | Liu | |
| 6,250,879 B1 * | 6/2001 | Lampes | 415/174.2 |
| 6,397,604 B2 * | 6/2002 | Eldrid et al. | 60/782 |
| 2002/0172591 A1 * | 11/2002 | Glynn et al. | 415/115 |
| 2005/0206087 A1 * | 9/2005 | Hogg et al. | 277/355 |
| 2008/0128995 A1 * | 6/2008 | Vallance et al. | 277/355 |

FOREIGN PATENT DOCUMENTS

| | | |
|---|---|---|
| GB | 2 198 195 A | 6/1988 |
| GB | 2 393 766 A | 4/2004 |
| JP | S63-152771 A | 6/1988 |
| JP | A-7-217452 | 8/1995 |
| JP | 2001-506342 A | 5/2001 |
| JP | 2006-342812 A | 12/2006 |
| WO | WO 97/36094 A1 | 10/1997 |
| WO | 98/28521 A1 | 7/1998 |

OTHER PUBLICATIONS

European Search Report issued in Application No. 10177952.8; Dated Jun. 28, 2011.

* cited by examiner

*Primary Examiner* — Phutthiwat Wongwian
(74) *Attorney, Agent, or Firm* — Studebaker & Brackett PC

(57) ABSTRACT

An apparatus is provided for sealing a channel fluidly connecting between a high pressure zone and a low pressure zone. The apparatus has at least two brush seal elements provided in the channel in series in a direction from the high pressure zone toward the low pressure zone to define an intermediate zone between the brush seal elements. The intermediate zone is fluidly connected to the low pressure zone through a bypass or passage, allowing a fluid in the intermediate zone to flow in part through the bypass to the low pressure zone.

9 Claims, 6 Drawing Sheets

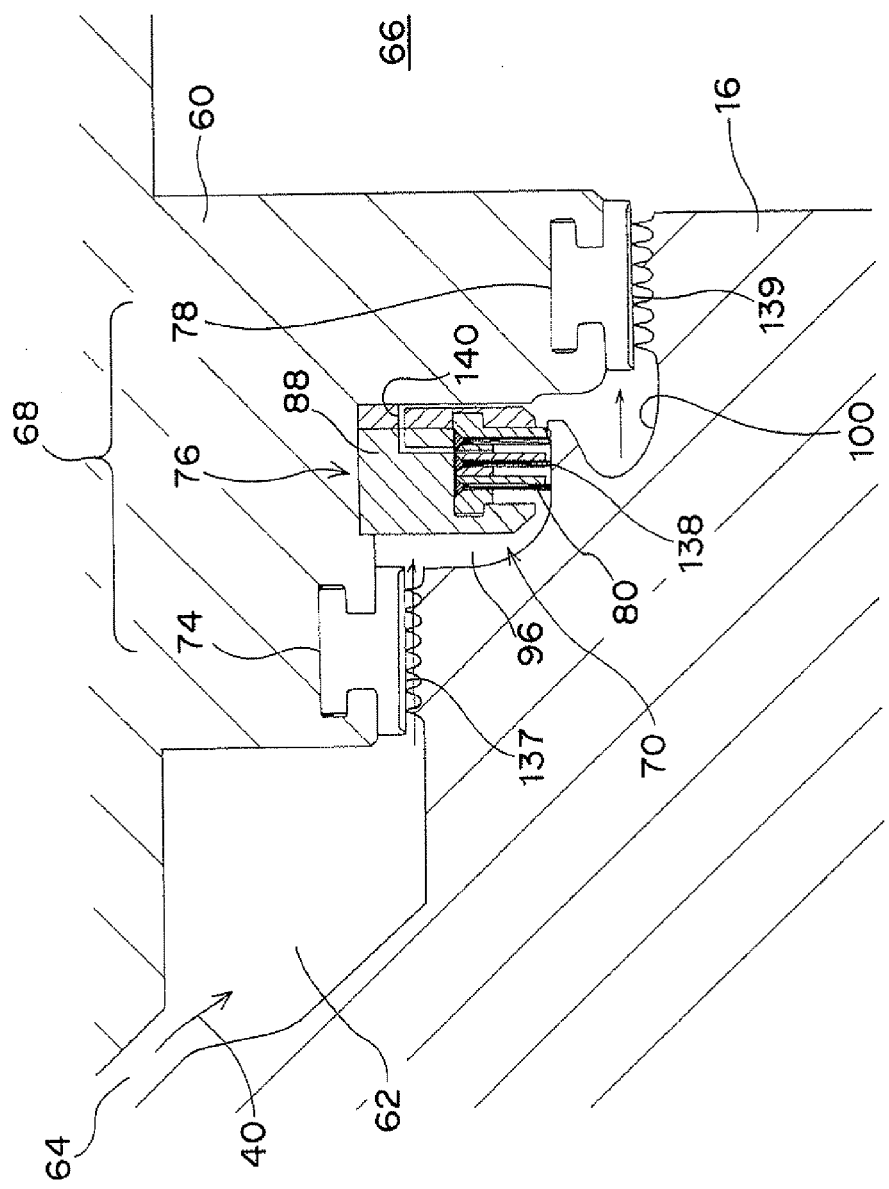

SEALING APPARATUS WITH MULTISTAGE BRUSH SEAL

FIELD OF THE INVENTION

The present invention relates to a non-contact sealing apparatus and a method for sealing a channel fluidly connecting between a high pressure zone and a low pressure zone by means of a multi-stage brush seal. Also, the present invention relates to an apparatus such as gas turbine engine which incorporates the multi-stage brush seal.

BACKGROUND OF THE INVENTION

There have been known gas turbine engines incorporating a bearing accommodated within a bearing chamber defined at an intermediate region between a compressor and a turbine in order to rotatably support a rotor. Typically, the bearing chamber is maintained substantially at an atmospheric pressure. This may cause an unwanted flow of compressed air generated by the compressor through the bearing chamber into the atmosphere. To minimize the compressed air to be wasted, conventionally non-contact labyrinth seals are mounted in the compressed-air channel. The labyrinth seal is economical and highly reliable, however, it has disadvantages, among others, that a considerable amount compressed-air is likely to be leaked therethrough into the atmosphere. To cope with this, it has been developed a non-contact brush seal element with wire bristles, which is described in JP 07-217452 (A).

The brush seal element functions as expected under a certain pressure. This in turn means that, under significantly high pressure circumstances, a multi-stage brush seal made of a plurality of serially arranged brush seal elements should be employed. In actual use environments, however, each brush seal element does not undertake substantially the same pressure and the most-downstream brush seal element is subjected to the highest pressure caused by the pressure difference between the upstream and downstream sides thereof. The reason is that the pressure and density of the compressed air decrease but its volume expands and thereby the rate of volume flow passing by the brushes increases substantially in a stepwise manner, which causes that the most-downstream brush seal element is exposed to the highest pressure.

As a result, the brush seal elements positioned on the downstream side, in particular the most-downstream seal element, are more likely to wear out quickly. Therefore, without a sufficient running-in period, the most-downstream brush seal element becomes nonfunctional in a short period of time and then the nonfunctioning is transmitted sequentially to the upstream brush seal elements, which results in a significant reduction in durability and reliability and also a significant increase of maintenance cost of the entire brush seal mechanism used in, for example, gas turbine engines.

SUMMARY OF THE INVENTION

Therefore, it is an object of the present invention to provide a multi-stage brush seal apparatus which exercises a long term, stable and reliable sealing function and a gas turbine engine incorporating that apparatus.

In order to achieve the foregoing object, the present invention provides an apparatus for sealing a channel fluidly connecting between a high pressure zone and a low pressure zone. The apparatus comprises at least two brush seal elements provided in the channel in series in a direction from the high pressure zone toward the low pressure zone to define an intermediate zone between the two brush seal elements; and a bypass fluidly connecting the intermediate zone to the low pressure zone, allowing a fluid in the intermediate zone to flow in part through the bypass to the low pressure zone.

According to this aspect of the invention, the compressed air in the intermediate zone flows in part through the bypass into the low pressure zone, which reduces a pressure to be undertaken by the downstream brush seal element. This prevents any one of the brush seal elements from wearing out and increases a durability and reliability of the sealing apparatus.

In another aspect of the invention, the apparatus has three or more brush seal elements to define two or more intermediate zones. In this instance, at least one of the intermediate zones provided adjacent the low pressure zone is fluidly connected to the low pressure through the bypass. This aspect of the invention is more advantageous because the durability of the most-downstream brush seal element suffering the most wearing damages and the gas turbine engine incorporating the sealing apparatus is significantly increased.

In another aspect of the invention, the apparatus has at least one labyrinth seal provided in the channel. This aspect is advantageous because the combination of the brush seal and the labyrinth seal ensures a more reliable sealing function.

In another aspect of the invention, the apparatus has a control unit for controlling an amount of fluid passing through the bypass. This aspect is advantageous because the pressure to be undertaken by the brush is precisely controlled to increase the durability and reliability of the brush seal.

Preferably, the sealing apparatus is incorporated in a gas turbine engine. This ensures that, due to the increased advantages of the sealing apparatus, a durability and reliability of the gas turbine engine is increased and its maintenance cost is reduced.

BRIEF DESCRIPTION OF THE DRAWINGS

The present invention will become more fully understood from the detailed description and the accompanying drawings, wherein:

FIG. 2 is cross sectional view of a sealing station in FIG. 1;

DETAILED DESCRIPTION OF THE PREFERRED EMBODIMENTS

The following descriptions of the preferred embodiments are merely exemplary in nature and are in no way intended to limit the invention, its application, or uses.

Hereinafter, preferred embodiments of the present invention will be described with reference to the accompanying drawings.

Figure 1:
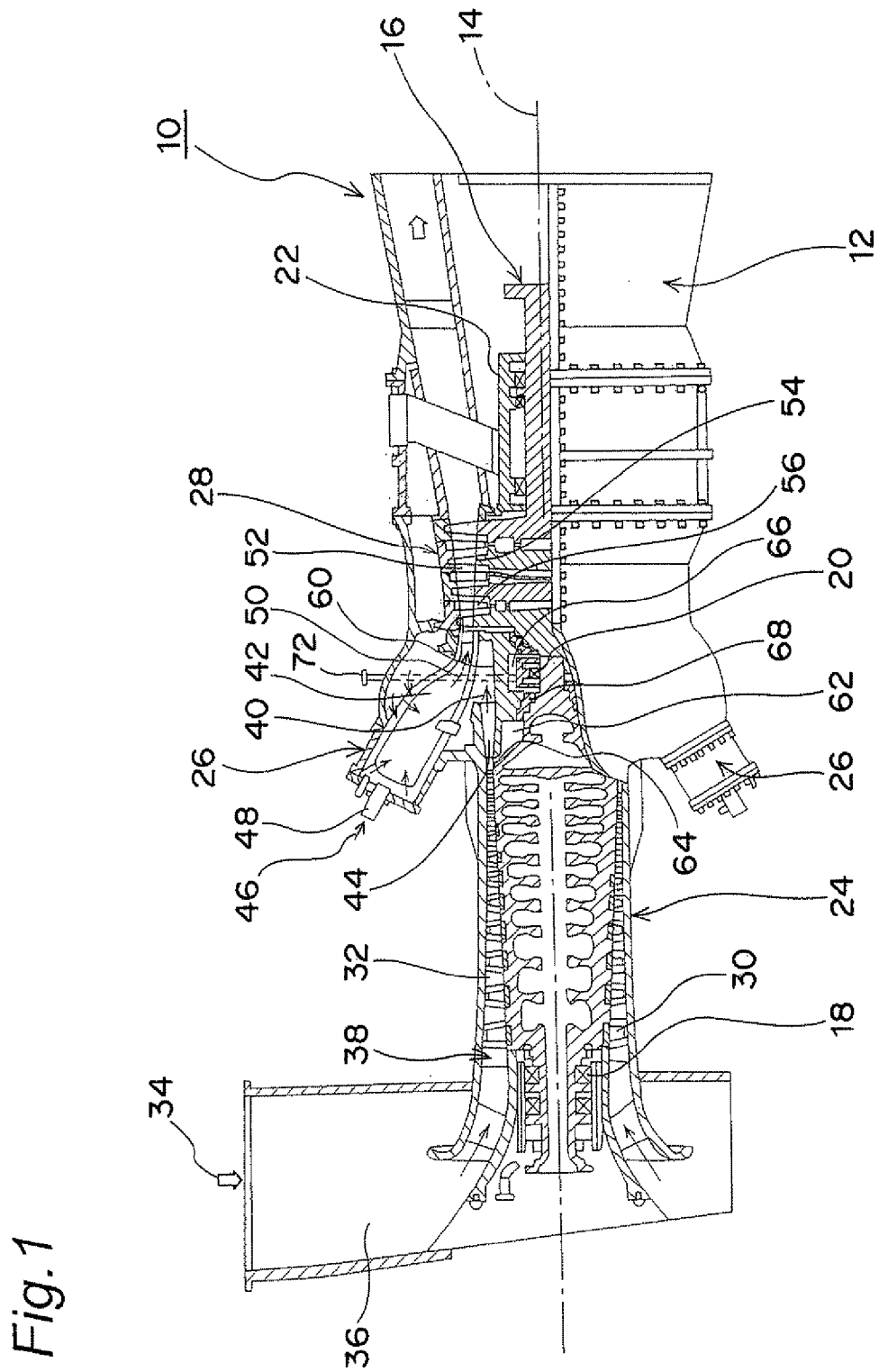
FIG. 1 is a partially broken-away side elevation of a gas turbine engine.

FIG. 1 shows a partially broken-away side elevation of a gas turbine engine, generally indicated by reference numeral 10, which incorporates a sealing mechanism or arrangement according to the embodiment of the invention.

As is known in the art, the gas turbine engine 10 has a cylindrical outer casing, generally indicated by reference numeral 12, having a rotating central axis 14 therein and a rotor, generally indicated by reference numeral 16, accommodated and supported within the casing 12 for rotation about the longitudinal axis 14. In the exemplary embodiment, the rotor 16 is made of two portions, i.e., a left or front/upstream portion and a right or rear/downstream portion, connected to each other by a suitable connecting mechanism and supported by, for example, three bearings 18, 20, and 22.

The outer casing 12 and the rotor 16 cooperate with each other to form an axial compressor, generally indicated by reference numeral 24, for compressing intake gaseous fluid such as air, a plurality of combustors each generally indicated by reference numeral 26 mounted at regular circumferential intervals around the rotor 16 for combusting fuel with the compressed air to generate combustion gases, and a turbine generally indicated by reference numeral 28 for inducing rotations of the rotor 16 by the use of the combustion gases.

In the exemplary embodiment, the compressor 24 has a plurality stages of compressor rotor blades 30 securely mounted on the outer circumferential surface of the rotor 16 and a plurality stages of associated compressor stator vanes 32 securely mounted on the opposed inner circumferential surface of the casing 12, so that an intake air 34 supplied from the intake way 36 into the annular compression chamber 38 defined between the opposed circumferential surfaces of the casing 12 and the rotor 16 is highly compressed by the cooperation of the rotor blades 30 and the stator vanes 32 to generate the compressed air 40.

The compressed air 40 is channeled into the combustion chambers 42 of the combustors 26 through a diffuser or diffusers 44 fluidly connecting the compressor and the combustors 26. In each combustor 26, the compressed air 40 is mixed with fuel 46 ejected from the nozzle 48 and then combusted to generate combustion gases 50. The combustion gases 50 are delivered into an annular turbine chamber 52 defined between the outer casing 12 and the rotor 16 to rotate the rotor 16.

In the exemplary embodiment, similar to the compressor 24, the turbine 28 has a plurality stages of turbine rotor blades 54 securely mounted on the outer circumferential surface of the rotor 16 and a plurality stages of associated turbine stator vanes 56 securely mounted on the opposed inner circumferential surface of the casing 12, so that the combustion gases 50 are injected onto the turbine rotor blades 54 to generate rotations of the rotor 16.

The engine 10 has an inner casing 60 securely supported inside the outer casing 12 and positioned between the rotor 16 and the combustors 26 to surround the intermediate bearing 20. In the exemplary embodiment, the diffuser 44 is defined between the outer surface of the inner casing 60 and the opposed rearwardly extending portions of the outer casing 12. Also, a front cavity 62, which is formed between the front end portion of the inner casing 60 and the axially opposed circumferential portion of the rotor 16, is fluidly connected to the downstream end of the compression chamber 38 and the upstream end of the diffuser 44 through a circumferential slot or inlet 64 defined between the rotor 16 and the inner casing 60 so that the compressed air 40 flows in part into the front cavity 62 for cooling the rotor 16.

A bearing chamber 66 is defined between the inner casing 60 and the rotor 16 for accommodating the intermediate bearing 20. Also, a sealing station generally indicated by reference numeral 68 is provided between the front cavity 62 and the bearing chamber 66 to seal an annular channel 70 (see FIG. 2) between the inner casing 60 and the rotor 16.

Referring to in FIG. 2, the front cavity 62 is fluidly connected through the inlet 64 to the downstream end of the compression chamber 38, so that it is filled with the highly compressed air 40 to form a high pressure zone. The bearing chamber 66, on the other hand, is fluidly connected at a downstream end thereof to an atmosphere through an intake tube or passage 72 to form a low pressure zone. Then, the sealing station 68 is mounted in the channel 70 between the high pressure and low pressure zones to resist a pressure difference therebetween and seal the channel 70.

The sealing station 68 has annular first to third sealing devices or sections, generally indicated by reference numerals 74, 76, and 78, respectively, positioned in this order from the upstream side toward the downstream side. Each of the sealing sections 74, 76, and 78 is made of non-contact sealing mechanism. For example, each of the most-upstream and the most-downstream sealing sections, i.e., first and third sealing sections 74 and 78, is made of a conventional labyrinth seal. The intermediate second sealing section 76 is made of a multi-stage brush seal 80. In the exemplary embodiment, the brush seal 80 has annular, three brush seal elements 82, 84, and 86 which will be described in detail below.

Figure 3A:
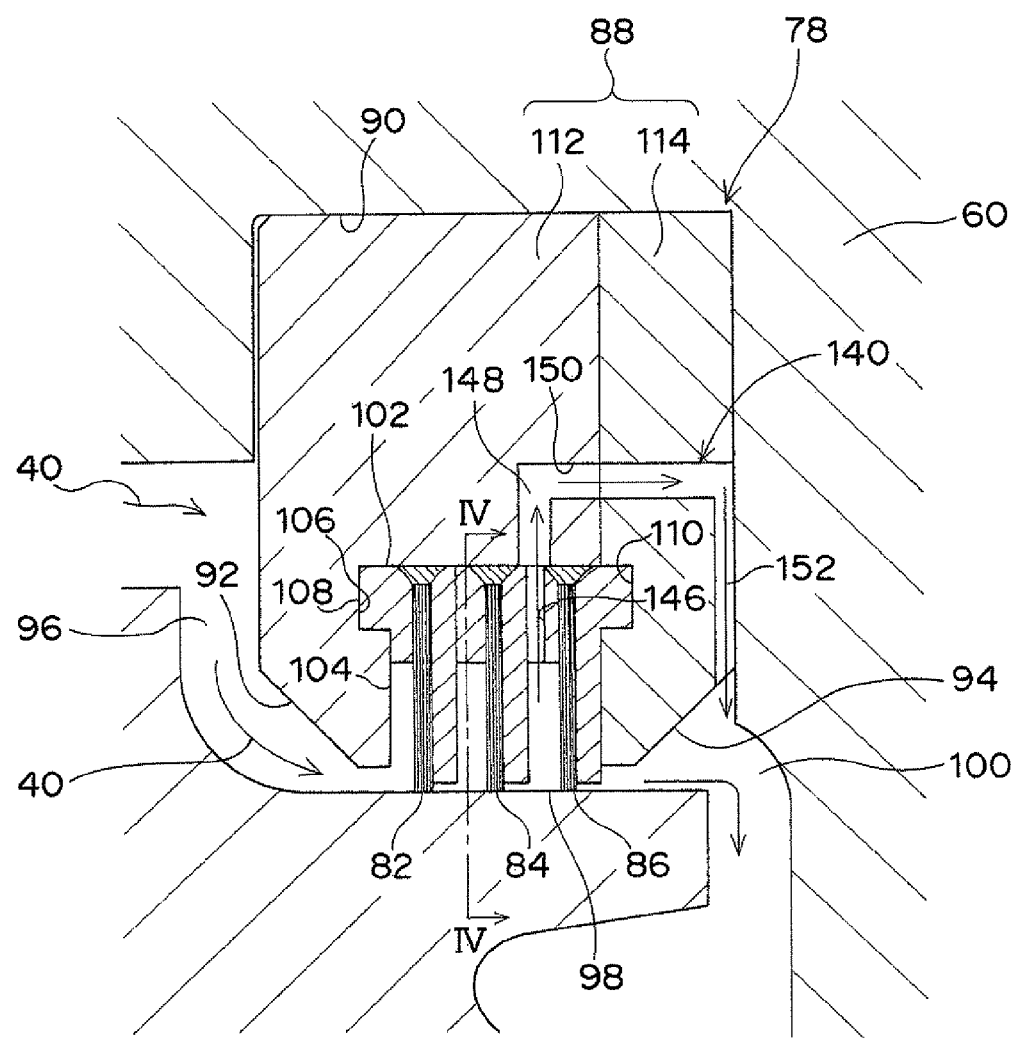
FIG. 3A is a cross sectional view of a second sealing section incorporating a brush seal.

Referring to FIG. 3A, the second sealing section 76 has an annular ring-like holder 88 which is preferably snug-fitted in an associated annular recess 90 defined in the inner circumferential surface of the inner casing 60. Preferably, the upstream and downstream inner circumferential corners of the holder 88 are chamfered to form upstream and downstream, tapered and inversely-tapered guide surfaces 92 and 94 for guiding the compressed air 40 from an upstream channel portion (high pressure zone) 96 fluidly connecting between the first and second sealing sections 74 and 76 into a sealing zone 98 of the second sealing section 76 and from the sealing zone 98 into a downstream channel portion (low pressure zone) 100 fluidly connecting between the second and third sealing sections 76 and 78, respectively.

The holder 88 has an annular groove 102 defined in an inner circumferential surface portion thereof. Preferably, the groove 102 has an inner groove portion 104 having a first width extending in the axial direction and an outer groove portion 106 having a second width extending in the axial direction beyond the upstream and downstream radial surfaces defining the inner groove 104 to form upstream and downstream annular recesses 108 and 110.

Preferably, the holder 88 is made of a plurality of ring members. In the exemplary embodiment, the holder 88 is made of two rings, upstream and downstream rings 112 and 114 and the annular groove 102 is defined by machining opposed radial surfaces of the rings 112 and 114. Preferably, each of the rings 112 and 114 is divided into two or more arcuate segments which are designed to be assembled together to form the complete annular ring member. The rings 112 and 114 so constructed are assembled to each other to form the holder 88 which is snug-fitted in the annular recess 90.

Figure 3B:
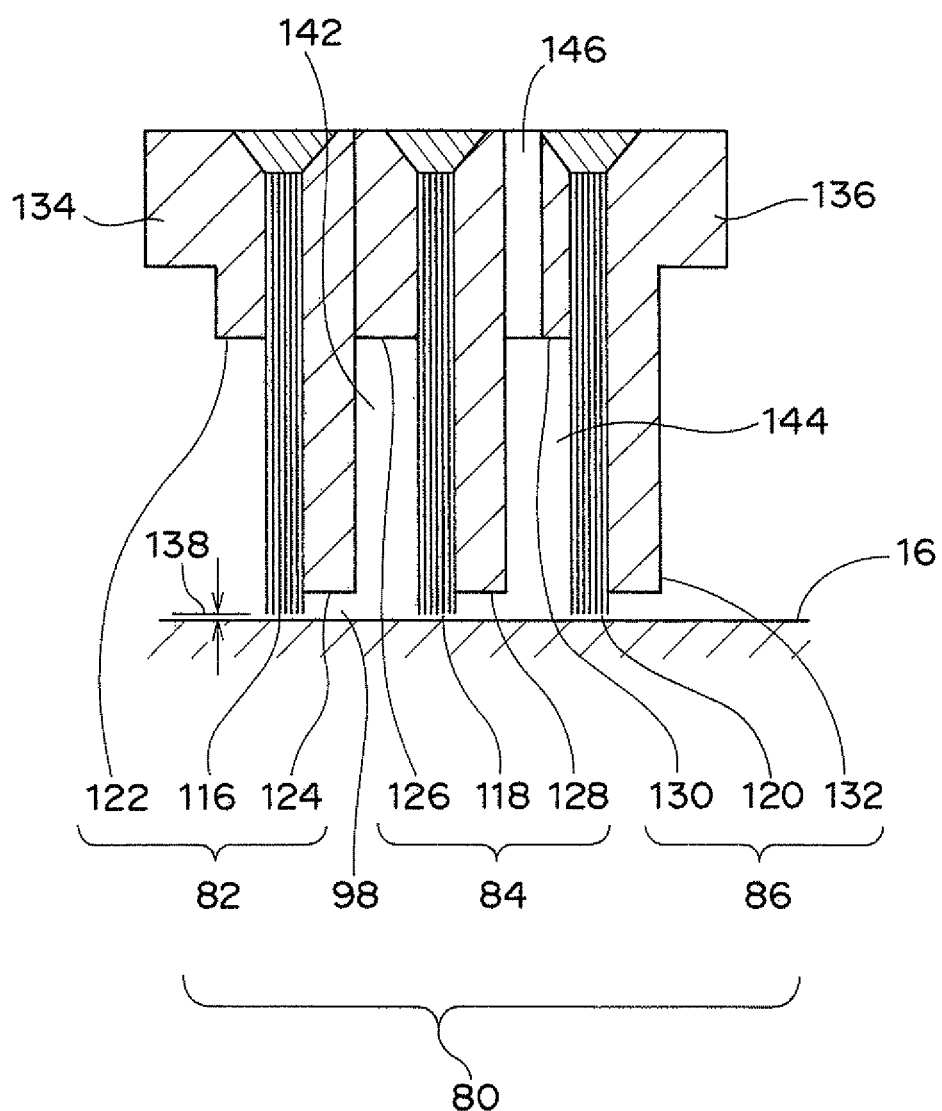
FIG. 3B is a cross sectional view of the brush seal.

Referring to FIGS. 3A and 3B, the holder 88 holds three stages of annular brush seal elements 82, 84, and 86 in the groove 102. According to the embodiment, the brush seal elements 82, 84, and 86 have annular brushes 116, 118, and 120, respectively. The brushes 116, 118, and 120 are sandwiched between ring-like front and rear plates, 122 and 124, 126 and 128, and 130 and 132, provided on the upstream and downstream sides thereof, respectively. Preferably, each of the front and rear plates is made of two or more arcuate segments which are designed to be assembled together to form the complete annular ring member.

The front and rear plates have the same outer diameter while the rear plates have a smaller inner diameter than that of the front plates so as to support the brushes from their behinds and thereby to prevent excessive bending of the brushes due to pressure differences between upstream and downstream sides thereof. Also, the first stage front plate 122 and the third stage rear plate 132 are in part projected in the upstream and downstream directions to form annular projections 134 and 136 which are snug-fitted in the associated annular recesses 108 and 110 of the holder 88, respectively.

Figure 4:
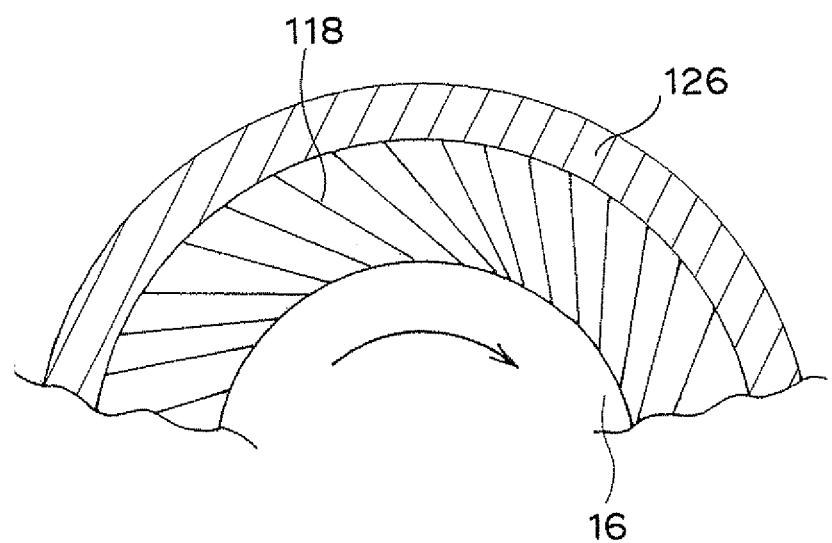
FIG. 4 is a cross sectional view taken along lines IV-IV in FIG. 3A.

The brushes 116, 118, and 120, which are made of a number of wire-type bristles, are sandwiched and held by the associated front and rear plates 122 and 124, 126 and 128, and 130 and 132, respectively, so that the innermost ends thereof are slightly projected from the innermost ends of the rear plates toward a circumferential outer surface of the rotor to terminate in close proximity to the circumferential surface of the rotor, leaving small sealing gaps 138 therebetween. Preferably, as shown in FIG. 4, the bristles are inclined circumferentially in the rotational direction of the rotor 16, indicated by an arrow in the drawing.

When assembling, the brush seal elements 82, 84, and 86 are fitted in this order in the front portion of the groove 102 defined in the front ring 112. In this instance, the forwardly enlarged front projection 134 of the front plate 122 is snug-fitted in the associated frontward-enlarged recess 108 of the holder 88. Then, the rear ring 114 is fitted on the third stage brush seal element 86 so that the rearwardly enlarged rear projection 136 is snugly-fitted in the associate rearwardly-enlarged recess 110.

Referring to FIG. 3A, the second sealing section 78 has one or more bypasses each generally indicated by reference numeral 140 for guiding a part of the compressed air from an annular intermediate zone or sealing chamber 142 or 144 (see FIG. 3B) defined between the neighborhood brush seal elements 82 and 84 or 84 and 86 into a downstream channel portion 100 fluidly connecting between the second and third sealing sections 78 and 80.

In an exemplary embodiment, the bypass 140 has four passages 146, 148, 150, and 152 fluidly connected in series in this order. The first passage 146 is defined in the form of groove in a front surface of the front plate 130 of the third stage brush seal 86. The second to fourth passages 148, 150, and 152 are defined in the holder 88. Specifically, the second passage 148 is defined in the front ring 112 to extend radially outwardly from the inner circumferential surface of the front ring 112. The first and second passages 146 and 148 are fluidly connected with each other when assembling the front and rear rings 112 and 114. The third passage 150 is made of two portions defined in the front and rear rings 112 and 114 so that the portions are fluidly connected with each other at the assembling of the holder 88. The fourth passage 152 is defined in the rear plate 114 of the holder 88. Preferably, the fourth passage 152 is defined in the rear surface of the ring 88.

Operations of the sealing station 68 so constructed will be described. As shown in FIG. 1, the compressed air 40 generated by the compressor 24 is in large part delivered through the diffuser 44 into respective combustors 26. Also, the compressed air 40 is in small part delivered through the inlet 64 at the downstream end of the compressor, i.e., immediately before the diffuser 44, into the front cavity 62 to cool the rotor 16.

The existence of the sealing station 68 separates the channel 70 into upstream high pressure zone (front cavity 62) and downstream low pressure zone (bearing chamber 66). Here, each of the sealing sections 74, 76, and 78 is made of non-contact sealing mechanism, so that a part of the compressed air 40 in the high pressure zone leaks through small gaps 137, 138, and 139 (see FIG. 2) at respective seal sections 74, 76, and 78 into the low pressure zone as its pressure decreases substantially in the stepwise manner.

In particular at the seal section 76, as shown in FIG. 3A, the compressed air 40 passed through the most-upstream first sealing section 74 made of labyrinth seal flows in the upstream channel portion (high pressure zone) 96 and then into the second sealing section 76 with brush seal elements 82, 84, and 86. At the second sealing section 76, the compressed air 40 flows through the first gap 138 into the first sealing chamber 142 as it is restricted by the first brush 116. Also, the compressed air 40 in the first sealing chamber 142 flows through the second gap 138 into the second sealing chamber 144 as it is restricted by the second brush 118. Further, a part of the compressed air 40 in the second sealing chamber 144 flows through the third gap 138 into the downstream channel portion (low pressure zone) 100 as it is restricted by the third brush 120. A remainder of the compressed air in the second sealing chamber 144 flows through the bypass 140 into the downstream channel portion 100.

Ideally, it is expected that the three stages of brushes 116, 118, and 120 is subjected to substantially the same pressure. Practically, however, if there were no bypass described above, one brush would be subject to a larger pressure, i.e., pressure difference between the adjacent upstream and downstream chambers or channel portions, than another brush located on the upstream side thereof, namely, the third brush would undertake the largest pressure than the first and second brushes, which results in a considerable wear damage to the most-downstream brush.

According to the embodiment, the existence of the bypass 140 allows a part of the compressed air in the second sealing chamber 144 to flow therethrough into the downstream channel portion 100 and thereby to reduce the pressure undertaken by the most-downstream brush 120 and a resultant wear damage of the most-downstream brush 120, which increases a durability and sealing reliability of the brush seal and the gas turbine engine which incorporates the brush seal.

Figure 5:
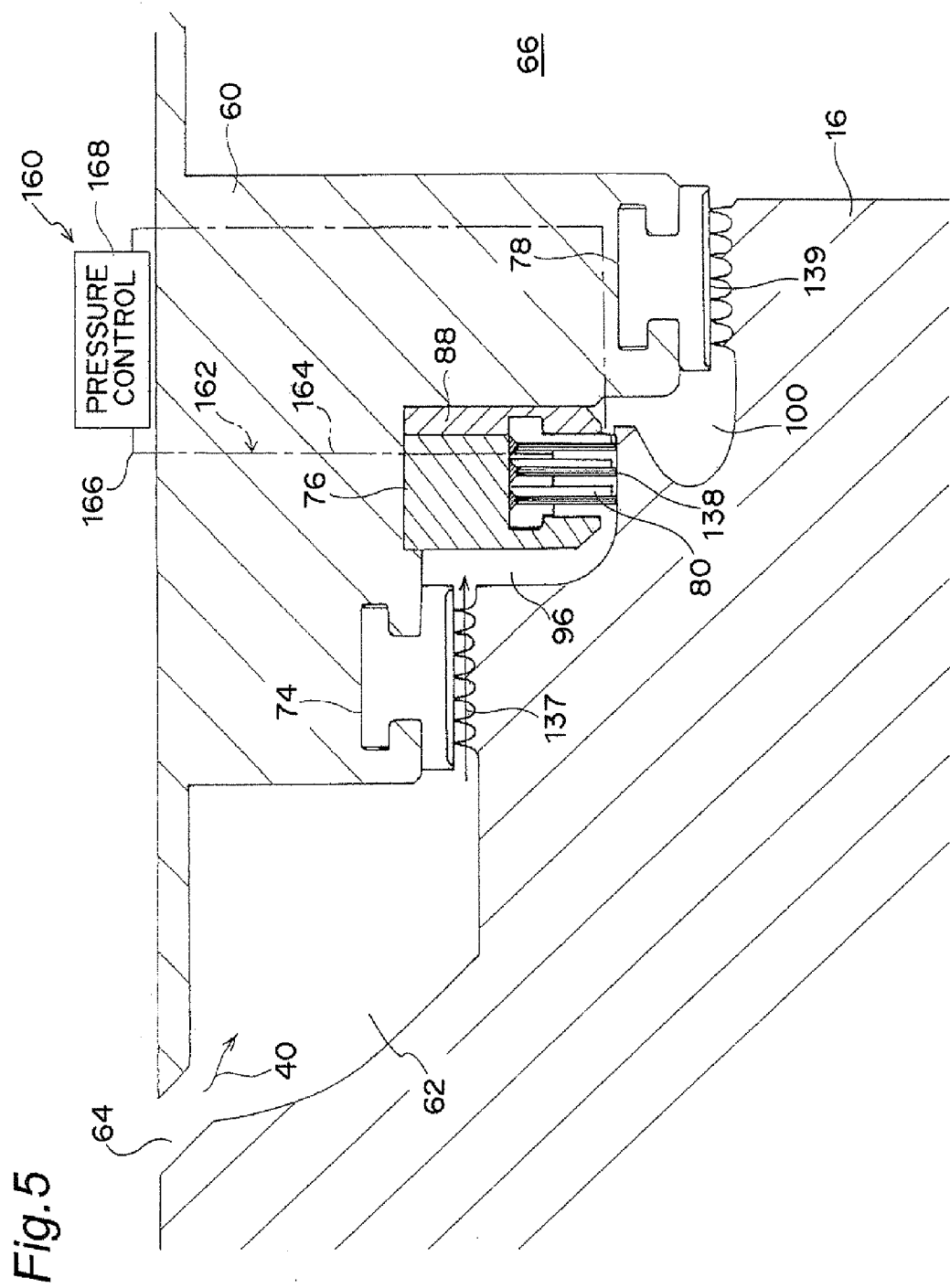
FIG. 5 is a cross sectional view of a second sealing section according to another embodiment of the invention.

Referring to FIG. 5, a sealing device according to another embodiment will be described below. Except as otherwise described below, the sealing device and the gas turbine engine incorporating the sealing device have the same structures as those in the previous embodiment described above.

Specifically, the sealing device generally indicated by reference numeral 160 has a bypass 162. Although not described in detail, the bypass 162 has one or more passages 164 and one or more tubes 166, fluidly connected with the channel portion 100, for connecting any one of the sealing chambers 142 and 144 (see FIG. 3B) located between the adjacent upstream and downstream brushes to the downstream channel portion 100 between the second and third sealing sections 78 and 80. The tube 166 has a pressure control 168. The control 168 has a pressure control valve and an electronic unit (both not shown) for detecting a pressure difference between the sealing chamber 144 and the channel portion 100 and, base upon the detected pressure difference, controlling an opening of the valve and thereby to control the pressure which is undertaken by the brush 120 (see FIG. 3B). Conventional pressure controls are available for the pressure control 168, and a suitable pressure control may be selected taking account of, for example, mounting spaces, required accuracy and reliability, and cost performance thereof. Also, any conventional valves such as relief valve may be used for the control valve.

According to this embodiment, the pressure control 168 precisely controls the pressure to be undertaken by the most-downstream brush 120, which increases a durability and reliability of the sealing mechanism.

The description of the invention is merely exemplary in nature and, thus, variations that do not depart from the gist of the invention are intended to be within the scope of the invention. Such variations are not to be regarded as a departure from the spirit and scope of the invention.

For example, although three brush seal elements 82, 84, and 86 are provided to the brush seal section in the previous embodiment, the brush seal section may be constructed using two or four or more brush seal elements.

Also, although only the second sealing section is made of brush seal in the previous embodiments, the first and/or third sealing section may be made of the brush seal or seals. Of course, the first to third sealing sections may be made of brush seals. For the purpose of attaining an enhanced sealing performance, different types of seals may be used in combination.

Further, although the brush seal is positioned between the labyrinth seals in the previous embodiment, they may be arranged in different orders depending upon the circumstances.

Furthermore, although the brush seal is secured on the non-rotating housing in the previous embodiment, it may be secured on the rotor instead.

Moreover, although discussions have been made to specific embodiments in which the multi-stage brush seal is mounted in the gas turbine engine, the present invention may be incorporated in various devices for the purpose of sealing a channel between high pressure and low pressure zones.

Further, both sealing chambers 142 and 144 may be fluidly connected to the downstream channel portion 100. In this instance, cross sections of the bypasses for the sealing chambers 142 and 144 may be differed from each other to allow different volumes of compressed air to flow out of the sealing chambers.

It should be noted that the above-described variations and modifications may be combined as necessary and such combinations also fall within the scope of the present invention.

PARTS LIST

10: gas turbine engine
12: outer housing
14: longitudinal axis
16: rotor
18, 20, 22: bearing
24: compressor
26: combustor
28: turbine
30: compressor rotor blade
32: compressor stator vane
34: intake air
36: intake way
38: compression chamber
40: compressed air
42: combustion chamber
44: diffuser
46: fuel
48: nozzle
50: combustion gas
52: turbine chamber
54: turbine rotor blade
56: turbine stator vane
60: inner casing
62: front cavity (high-pressure zone)
64: inlet
66: bearing chamber (low-pressure zone)
68: sealing station
70: channel
72: intake tube or passage
74, 76, 78: sealing section
80: brush seal
82, 84, 86: brush seal element
88: holder
90: recess
92, 94: guide surface
96: upstream channel portion
98: sealing zone
100: downstream channel portion
102: groove
104: inner groove portion
106: outer groove portion
108, 110: recess
112, 114: ring
116, 118, 120: brush
122, 126, 130: front plate
124, 128, 132: rear plate
134, 136: projection
137, 138, 139: gap
140: bypass
142, 144: sealing chamber
146: first passage
148: second passage
150: third passage portion
152: fourth passage portion
160: sealing device
162: bypass
164: passages
166: tube
168: pressure control

What is claimed is:

1. An apparatus for sealing a channel fluidly communicating between a high pressure zone and a low pressure zone, comprising:
    at least two brush seal elements provided in said channel in series in a direction from said high pressure zone toward said low pressure zone to define an intermediate zone between said two brush seal elements, each brush seal element having an annular brush and ring plates holding said brush therebetween; and
    a bypass fluidly communicating said intermediate zone to said low pressure zone, allowing a fluid in said intermediate zone to flow in part through said bypass to said low pressure zone,
    wherein a first bypass portion of said bypass is defined by a groove formed in a radially extending surface of one of said ring plates adjacent said intermediate zone.

2. The apparatus of claim 1,
    wherein said apparatus has three or more brush seal elements to define two or more said intermediate zones;
    wherein at least one of said intermediate zones provided adjacent said low pressure zone is fluidly communicated to said low pressure zone through said bypass.

3. The apparatus of claim 1, further comprising
    at least one labyrinth seal provided in said channel.

4. The apparatus of claim 1, wherein
    said bypass has a control for controlling an amount of said fluid passing through said bypass.

5. A method for sealing a channel fluidly communicating between a high pressure zone and a low pressure zone, comprising:
    providing at least two brush seal elements in said channel in series in a direction from said high pressure zone toward said low pressure zone to define an intermediate zone between said two brush seal elements, each brush seal element having an annular brush and ring plates holding said brush therebetween; and fluidly communicating said intermediate zone to said low pressure zone through a bypass, allowing a fluid in said intermediate zone to flow in part through said bypass to said low pressure zone, the bypass having a bypass portion which is defined by a groove formed in a radially extending surface of one of said ring plates adjacent said intermediate zone.

6. The method of claim 5, further comprising controlling an amount of said fluid passing through said bypass.

7. A gas turbine engine comprising:

a rotor:

a housing accommodating said rotor;

a compressor having a compression chamber for compressing gaseous fluid to generate a compressed fluid in said compression chamber;

a combustor having a combustion chamber for combusting fuel with the compressed fluid to generate combustion gases in said combustion chamber;

a turbine having a turbine chamber for inducing rotations of said rotor by using the combustion gases in said turbine chamber;

a bearing for bearing said rotor;

a first chamber fluidly communicated to said compression chamber;

a second chamber accommodating said bearing;

a channel fluidly communicating said first chamber to said second chamber;

at least two brush seal elements provided in said channel in series in a direction from said first chamber toward said second chamber to define an intermediate zone between said two brush seal elements; and a bypass fluidly communicating said intermediate zone to said low pressure zone, allowing said fluid in said intermediate zone to flow in part through said bypass to said second chamber.

8. The apparatus of claim 2, further comprising at least one labyrinth seal provided in said channel.

9. The apparatus of claim 2, wherein said bypass has a control for controlling an amount of said fluid passing through said bypass.

* * * * *